(12) United States Patent
Lee et al.

(10) Patent No.: US 9,195,320 B1
(45) Date of Patent: Nov. 24, 2015

(54) METHOD AND APPARATUS FOR DYNAMIC SIGNAGE USING A PAINTED SURFACE DISPLAY SYSTEM

(71) Applicant: Google Inc., Mountain View, CA (US)

(72) Inventors: Johnny Lee, Moutain View, CA (US); Eric Teller, Palo Alto, CA (US); William Graham Patrick, San Francisco, CA (US); Eric Peeters, Mountain View, CA (US)

(73) Assignee: Google Inc., Mountain View, CA (US)

( * ) Notice: Subject to any disclaimer, the term of this patent is extended or adjusted under 35 U.S.C. 154(b) by 338 days.

(21) Appl. No.: 13/657,372

(22) Filed: Oct. 22, 2012

(51) Int. Cl.
*G06F 3/03* (2006.01)
*H04M 1/2755* (2006.01)

(52) U.S. Cl.
CPC ........... *G06F 3/0304* (2013.01); *H04M 1/2755* (2013.01)

(58) Field of Classification Search
CPC ..... G06F 3/0304; G06F 3/038; H04M 1/2755
USPC ........................................................ 345/105
See application file for complete search history.

(56) References Cited

U.S. PATENT DOCUMENTS

| | | | |
|---|---|---|---|
| 5,319,747 A | 6/1994 | Gerrissen et al. | |
| 6,256,033 B1 | 7/2001 | Nguyen | |
| 6,840,627 B2 | 1/2005 | Olbrich | |
| 7,259,747 B2 | 8/2007 | Bell | |
| 7,611,396 B2 | 11/2009 | Schnuckle | |
| 8,237,654 B2 | 8/2012 | Kang | |
| 8,603,723 B2 | 12/2013 | Chang et al. | |
| 8,730,183 B2 | 5/2014 | Lundback et al. | |
| 2001/0012001 A1 | 8/2001 | Rekimoto et al. | |
| 2004/0205394 A1* | 10/2004 | Plutowski | ........................ 714/21 |
| 2005/0094109 A1 | 5/2005 | Sun et al. | |
| 2006/0007188 A1 | 1/2006 | Reiner | |
| 2006/0026521 A1 | 2/2006 | Hotelling et al. | |
| 2006/0259184 A1 | 11/2006 | Hayes et al. | |
| 2007/0139367 A1 | 6/2007 | Goffin | |
| 2007/0150953 A1* | 6/2007 | Hamid et al. | ................... 726/23 |

(Continued)

FOREIGN PATENT DOCUMENTS

EP          1591984  A2     11/2005

OTHER PUBLICATIONS

"Zombie-licious: Making Monsters with Lasers and Glow Paint," <http://gajitz.com/zombie-licious-making-monsters-with-lasers-and-glow-paint/>, Printed Aug. 6, 2012, 3 pages.

*Primary Examiner* — Ariel Balaoing
(74) *Attorney, Agent, or Firm* — Blakely Sokoloff Taylor & Zafman LLP

(57) ABSTRACT

A method and apparatus for generating dynamic signage using a painted surface display system is described. The method may include capturing image data with at least a camera of a painted surface display system. The method may also include analyzing the image data to determine a real-world context proximate to a painted surface, wherein the painted surface is painted with a photo-active paint. The method may also include determining electronic signage data based on the determined real-world context. The method may also include generating a sign image from the determined electronic signage data based on the determined real-world context, and driving a spatial electromagnetic modulator to emit electromagnetic stimulation in the form of the sign image to cause the photo active paint to display the sign image.

22 Claims, 6 Drawing Sheets

(56) References Cited

U.S. PATENT DOCUMENTS

| | | |
|---|---|---|
| 2007/0285399 A1 | 12/2007 | Lund |
| 2008/0004953 A1* | 1/2008 | Ma et al. .................. 705/14 |
| 2010/0160041 A1 | 6/2010 | Grant et al. |
| 2011/0161998 A1* | 6/2011 | Alberth et al. .................. 725/10 |
| 2012/0050687 A1 | 3/2012 | Berry et al. |
| 2012/0154511 A1 | 6/2012 | Hsu et al. |
| 2012/0218417 A1* | 8/2012 | Bilger et al. .................. 348/164 |
| 2013/0050258 A1 | 2/2013 | Liu et al. |

* cited by examiner

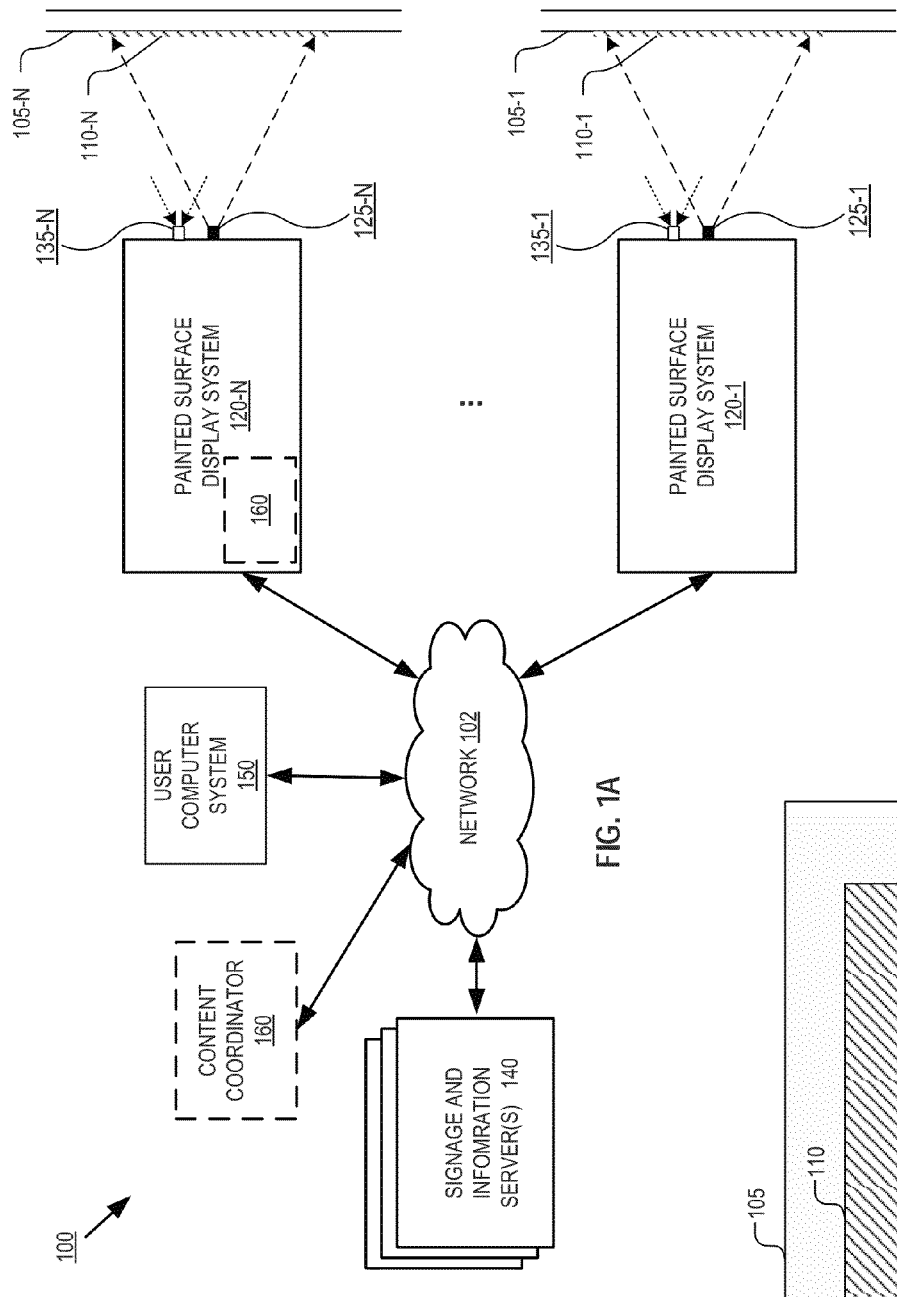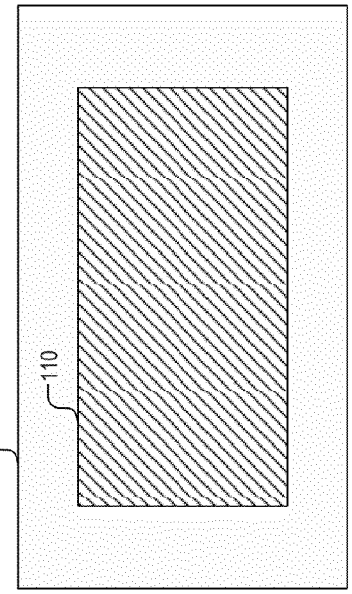

METHOD AND APPARATUS FOR DYNAMIC SIGNAGE USING A PAINTED SURFACE DISPLAY SYSTEM

TECHNICAL FIELD

Embodiments of the invention relate to the field of large-scale display systems, and more particularly, to the generation of large-scale displays.

BACKGROUND

Large wall displays can be prohibitively expensive as the cost to manufacture display panels rises exponentially with display area. This exponential rise in cost arises from the increased complexity of large monolithic displays, the decrease in yields associated with large displays (a greater number of components must be defect free for large displays), and increased shipping, delivery, and setup costs. The exponential rise in cost also includes the energy requirements associated with large wall displays. As a result, typical large wall displays are impractical for personal or home usage. Furthermore, coverage of large areas, or multiple different areas, with typical large wall displays is also impractical and prohibitively expensive.

SUMMARY

A method and apparatus for generating dynamic signage using a painted surface display system is described. According to an exemplary method, image data is captured with at least a camera of a painted surface display system. In one embodiment, the image data is analyzed to determine a real-world context proximate to a painted surface, wherein the painted surface is painted with a photo-active paint. In one embodiment, electronic signage data is determined based on the determined real-world context. In one embodiment, a sign image is generated from the determined electronic signage data based on the determined real-world context, and a spatial electromagnetic modulator is driven to emit electromagnetic stimulation in the form of the sign image to cause the photo active paint to display the sign image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1A is a block diagram of exemplary system architecture for enabling dynamic signage with a painted surface display system.

FIG. 1B illustrates a perspective view of a surface painted with a photo-active paint.

DETAILED DESCRIPTION

Figure 2:
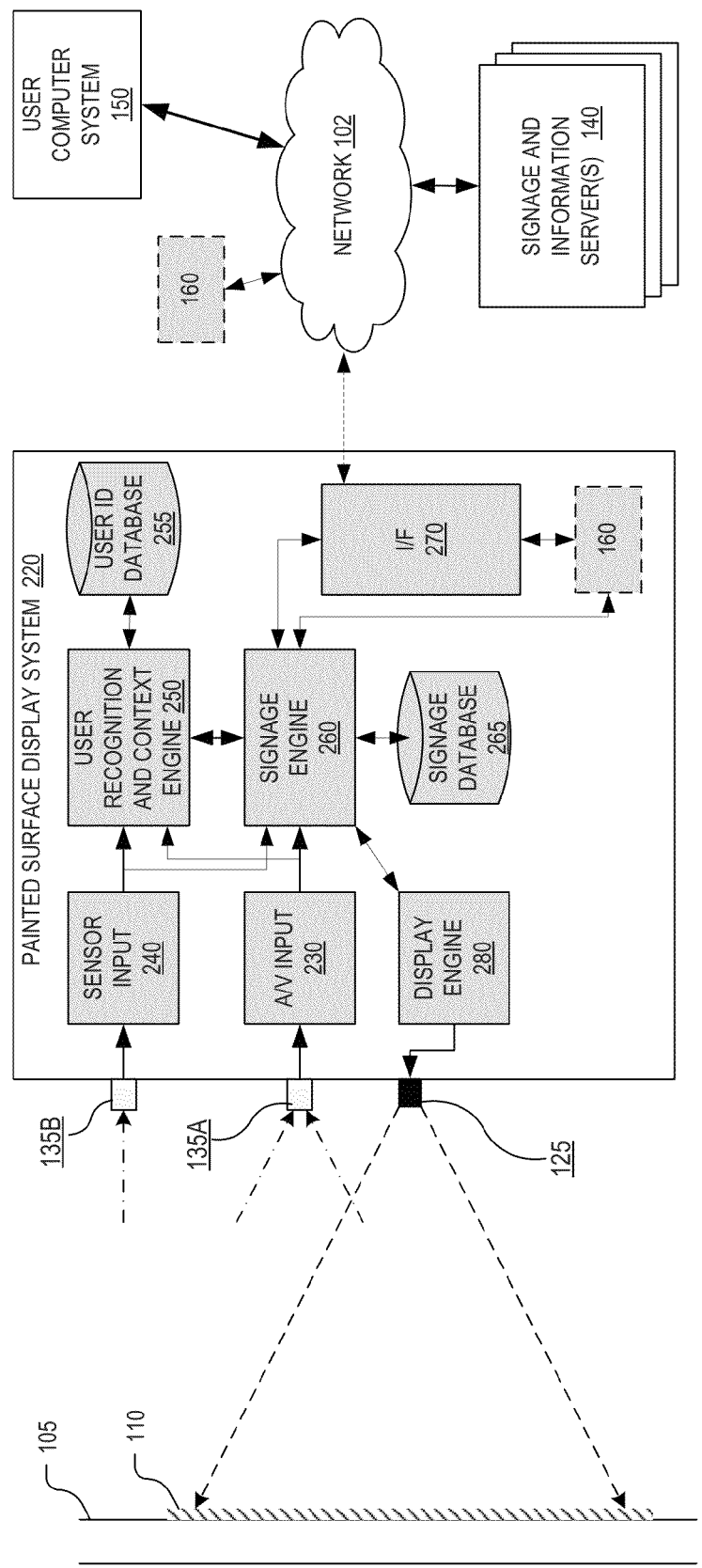
FIG. 2 is a block diagram of one embodiment of painted surface display system.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "analyzing", "selecting", "generating", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A is a block diagram of exemplary system architecture 100 for enabling dynamic signage with a painted surface display system. In one embodiment, the system 100 includes one or more painted surface display systems (PSDS) 120 (i.e., PSDS-1 through PSDS-N), user computer system 150, one or more signage and information server(s) 140, and optionally content coordinator(s) 160. In one embodiment, PSDSs 120, user computer system 150, one or more signage and information server(s) 140, content coordinator(s) 160 may each be a computing device, such as a desktop computer, laptop computer, personal digital assistant, tablet computer, a mobile telephone, a cellular communication enabled wearable device, etc. In one embodiment, one or more of PSDSs 120 are web-enabled self-contained computing devices.

The PSDSs 120, user computer system 150, signage and information server(s) 140, and content coordinator(s) 160 may be coupled to a network 102 that communicates any of the standard protocols for the exchange of information. In one embodiment, PSDSs 120, user computer system 150, signage and information server(s) 140, and content coordinator(s) 160 may be coupled with network 102 via a wireless connection, such as a cellular telephone connection, wireless fidelity connection, etc. The PSDSs 120, user computer system 150, signage and information server(s) 140, and content coordinator(s) 160 may run on one Local Area Network (LAN) and may be incorporated into the same physical or logical system, or different physical or logical systems. Alternatively, the PSDSs 120, user computer system 150, signage and information server(s) 140, and content coordinator(s) 160 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In one embodiment, PSDS 120 enables the display of images and/or videos on a painted surface. In one embodiment, one or more surface(s) 105-1 though 105-N, such as a walls, floors, ceilings, surfaces of objects, etc. within the real world, are painted with the same or different photo-active paints 110-1 though 110-N that display images in response to illumination by corresponding PSDSs 120. In one embodiment, the photo-active paint is stimulated by light of one or more particular wavelengths that displays an image in response to illumination. In one embodiment, the photo-active paint is stimulated by heat generated, for example, by a laser, by an electron beam, etc. by PSDSs 120.

FIG. 1B illustrates another perspective of a surface 105 painted with a photo-active paint 110. The photo-active paint 110 may be a photo-luminescent paintable material that emits visible spectrum light in response to one or more of electro-magnetic stimulation on a photo-chromic paintable material and temperature stimulation on a thermo-chromic paintable material that changes light absorption/reflection properties in response to the electromagnetic stimulation. These photo-active paints are available from companies such DuPont™, 3M™, and others.

In one embodiment, for each of PSDS 120-1 through PSDS 120-N, which are discussed as PSDS 120, audio-visual inputs/sensor inputs 135 and a spatial electromagnetic (EM) modulator 130 are coupled with PSDS 120. In one embodiment, and as discussed in greater detail below, each PSDS 120 includes a spatial electromagnetic EM modulator 125 and a display engine (not shown) coupled to drive the spatial EM modulator 125 with an image. In one embodiment, each PSDS 120 includes also includes an AV/sensor input 135 to capture image, sound, temperature, light, wind speed, ambient noise, etc. data for analysis. In one embodiment, the analysis of the input data is provided as feedback to the display engine which further drives spatial electromagnetic EM modulator 125 to update the image generated by spatial electromagnetic EM modulator 125.

In one embodiment, each PSDS 120 may be positioned remotely relative to a corresponding surface 105 (i.e., PSDS-i positioned with respect to surface 105-i, where 1≤i≤N) with a line of sight view of photo-active paint 110 painted on the surface 105. For example, each PSDS 120 may be mounted on a ceiling, back wall, or shelf. In one embodiment, during operation of each PSDS 120, spatial EM modulator 125 illuminates paint 110 with an image and/or video. Spatial EM modulator 125 may emit photons at different wavelengths (e.g., UV or visible spectrum), or emit electrons, in the form of an image, video, or pattern for illuminating paint 110.

If paint 110 is a photo-luminescent material, then the image illuminated onto paint 110 will cause paint 110 to re-emit photons in a pattern indicative of the image output by spatial EM modulator 125 of PSDSs 120. In some embodiments, the response time of paint 110 is quick enough to facilitate video images, or slow enough to display still images for finite periods of time. The still images may be refreshed periodically with the same image or a new image, thereby providing a low power display surface.

If paint 110 is a photo-chromic material, then illumination by spatial EM modulator 125 of PSDSs 120 cause paint 110 to alter its light absorbing/reflecting properties. For example, the illuminated regions of paint 110 may change color. If photo-chromic paint is illuminated with an image, then the image is displayed on surface 105. Again, the response time of paint 110 may be quick enough to facilitate video images, or slow enough to display still images for finite periods of time. The still images may be refreshed periodically with the same image or a new image, thereby providing a low power display surface. In one embodiment, photo-active paint 110 is a bi-stable e-ink, which can be made to change between one of two colors via appropriate illumination by spatial EM modulator 125. In one embodiment, photo-active paint 110 may be a tri-stable system, of a plurality of regions of the paint that include 3 color patches (one each of R, G, and B) in each region to show mainly one of those colors.

In one embodiment, PSDSs 120 may each output a registration pattern onto paint 110, which AV/sensor input 135 then captures. The captured image and sensor data is analyzed by PSDSs 120 to determine the size of area painted on a corresponding surface 105, properties of the painted surface (i.e., refresh rate, photo-sensitivity, imaging quality capabilities, color display capabilities, etc.), which is then used to adjust the zoom, size, video frame rate, etc. of the images and/or videos output from PSDSs 120. If a user repaints surface 105 with a larger or smaller painted area 110, repaints surface 105 with a different photo-active paint, or repositions one or more PSDSs 120 relative to a same or different painted surface (not shown), then the PSDSs 120 can be recalibrated. Additionally, if surface 105 is painted with a slow response photo-active paint 110, PSDSs 120 may monitor the image as it fades and determine the appropriate refresh rate and duty cycle for operating a display engine that drives EM modulator 125.

In one embodiment, photo-active paint 110 is a pixilated layout of multiple different photo-active paints, each having a different spectral response to illumination. For example three different R, G, B photo-active paints may be applied to surface 105 in a pixilated grid. When the R-type photo-active paint is illuminated, it subsequently emits or reflects red light for a period of time, when the G photo-active paint is illuminated, it subsequently emits or reflects green light for a period of time, and when the B-type photo-active paint is illuminated, it subsequently emits or reflects blue light for a period of time. By aligning or timing the EM stimulation from EM modulator 125 of PSDSs 120 with the color grid painted surface, the appearance of color images and videos may be created. Of course, other color combinations, or even gray scale paints may be used.

It should be appreciated that surfaces 105 and 105-1 through 105-N, as illustrated in FIGS. 1A and 1B, need not be just a wall. Rather, any surface (flat or curved) may be coated with photo-active paint and become a blank canvas upon which image and videos may be displayed and updated at will. Furthermore, in the embodiments discussed herein, photo-active paint 110 may be transparent or translucent in an unexcited state, and then become darker or emit photons in an excited state (i.e., when stimulated by light, heat, etc.). The translucent or transparent photo-active paint could be applied to any of surfaces 105 and 105-1 through 105-N when it is desirable for the corresponding surface to remain visible under the paint.

In one embodiment, EM modulator 125 displays dynamic signage on one or more of painted surface(s) 105-1 though 105-N. In one embodiment, the dynamic signage may be signage displayed on one or more photo-active painted surfaces of a convention center, one or more photo-active painted surfaces of a hotel, one or more photo-active painted surfaces of a private residence, etc. Furthermore, in contrast to typical physical signage such as banners, display setups, etc., dynamic signage is electronic signage displayed by PSDSs 120-1 through 120-N on corresponding photo-active painted surfaces 105-1 though 105-N.

For example, the dynamic signage displayed by PSDSs 120-1 through 120-N on corresponding photo-active painted surfaces 105-1 through 105-N may be informative signage displayed throughout a convention hall by event organizers and/or convention participants. As another example, and as discussed in greater detail below, dynamic signage displayed by PSDSs 120-1 through 120-N on corresponding photo-active painted surfaces 105-1 through 105-N may be intelligent direction signage (e.g., way finding) where arrows, dots, lines, or other direction indicators are dynamically displayed on photo-active painted surfaces of a hotel, convention center, etc. to provide real-world directions and routing information in real-time, or near real-time, to a user as the user moves through a building to a destination. As yet another example, dynamic signage displayed by PSDSs 120-1 through 120-N on corresponding photo-active painted surfaces 105-1 through 105-N may be personalized signage, displayed within user's home, hotel room, etc., that includes notification and/or popup messages with data obtained from various servers for specific users, such as email servers, microblogging servers, social networking servers, advertisement servers, financial servers, clock and calendar servers, etc.

In one embodiment, and in order to facilitate dynamic signage such as informative dynamic signage, directional dynamic signage, personalized dynamic signage, etc., each PSDS 120 attempts to recognize a specific user that is proximate to a PSDS 120 and a corresponding photo-active painted surface 105. In one embodiment, AV/sensor input 135 of the PSDSs 120 capture audiovisual data, such as image data, video data, audio data, light data, etc., and/or sensor data, such as radio-frequency identification (RFID) data, cell phone signal data, etc. In one embodiment, PSDSs 120 utilize the captured audiovisual data to recognize a specific user that is within a real-world space where a PSDS 120 is located, recognize a specific user who is using a direction service provided by PSDSs 120, etc. In one embodiment, PSDSs 120 may perform one or more computer vision processes, such as image recognition, face recognition, voice recognition, etc. to identify a user. In one embodiment, PSDSs 120 may alternatively, or additionally, perform identification via recognition of RFID data associated with a user (i.e., RFID chips embedded in a hotel key), cell phone signals for a phone associated with a user, etc.

In one embodiment, the user identification performed by PSDSs 120 enables each PSDS 120 to determine a context associated with a user. In one embodiment, the identification of a user is one aspect of a real-world context associated with the user. In one embodiment, additional data, such as a user's personal preferences received from user computer-system 150 and provided to PSDSs 120, a determination from one PSDS 120-$i$ as to a function (i.e., way finding, display of personal signage, etc.) being performed by another PSDS 120-$j$, context information provided by a content coordinator 160, determination of a user's movement direction, gestures, etc., inform PSDSs 120 as to a more complete real-world context surrounding a user.

In one embodiment, PSDSs 120 further determine how to display dynamic signage on a photo-active painted surface 105 based on the real-world context. As discussed herein, the real-world context surrounding a user may also include real-world factors that impact how electronic signage will be displayed, such as a crack in a wall where electronic signage is to be displayed, a gap in a surface (e.g., a hallway) that intersects electronic signage, a corner in adjoining walls, etc. In one embodiment, PSDSs 120 adapt electronic signage images to these real-world context factors by rotating, translating, scaling, decoupling and moving about separately more than one piece of the signage to, for example, avoid a crack in a wall where the signage will be projected. In one embodiment, PSDSs' 120 determination of how to adapt electronic signage to real-world factors enables PSDSs 120 to respond to issues which might not have been planned on by an electronic sign's creator.

In one embodiment, PSDSs 120 utilize the context data to determine and generate dynamic signage for display to a user on one or more surfaces 105-1 through 105-N painted with photo active paints 110-1 though 110-N.

In one embodiment, as discussed herein, different PSDSs 120-1 through 120-N may coordinate their display of dynamic signage, such as direction signage displayed by a sequence of PSDSs 120, informative signage displayed concurrently or at different times by PSDSs 120, or personalized signage displayed to users proximate to, and identified by, a corresponding PSDS 120. In one embodiment, where two or more PSDSs, such as PSDS 120-1 through 120-N are located such that they will display dynamic signage for the same purpose (i.e., directions, personalized signage, etc.), the PSDS 120-1 through 120-N may coordinate their signage display either via one or more of a content coordinator 160 or via context determination at individual PSDSs 120.

In one embodiment, PSDSs 120 may receive direction as to what signage to display to a user from a content coordinator 160. In one embodiment, the content coordinator may be a server computer system 160 that communicates with PSDS 120-1 through 120-N via network 102. In one embodiment, the server content coordinator 160 may track what PSDSs are displaying signage and to what users. Based on the signage display tracking and user tracking, content director 160 can direct particular PSDSs 120 to update their current displays. For example, where server content coordinator 160 is tracking dynamic direction signage being displayed to a user, server content coordinator 160 tracks user, what PSDS 120 is currently displaying the directional signage, and a next PSDS 120 that is to continue the direction signage in order to direct a user to their destination. In one embodiment, one or more PSDSs, such as PSDS 120-N, may have a content coordinator server 160. In one embodiment, the content coordinator server 160 within PSDS 120-N would perform, or aid server content coordinator 160, with user tracking, dynamic signage tracking, and determination of one or more PSDSs 120 that are to display dynamic signage concurrently and/or sequentially.

In one embodiment, instead of utilizing a content coordinator server 160, PSDS 120-1 through 120-N utilize context data to determine what signage to display to a user. In one embodiment, PSDSs 120 monitor a user's context, as well as a context of what a proximate PSDS is displaying to a user, and the function being performed. In one embodiment, based on the determined user context and the proximate PSDS context, each PSDSs 120 may update or generate a display to continue a determined function and display. For example, for a series of PSDSs, such as PSDS 120-1 through 120-N deployed within hallways of a hotel, each PSDS could perform user identification, track user movement, and determine whether a proximate PSDS is generating dynamic directional, informative, or personalized signage for a user. Based on this context data, each PSDS may determine to update their display based on the context data to continue or update the display of the dynamic direction, informative, or personalized signage (e.g., update arrows displayed on photo-active painted surfaces as a user is walking down a hotel hallway to their destination).

In one embodiment, as discussed herein, each PSDS 120 may also provide personalized signage to specific users. In one embodiment, a PSDS 120 may perform user identification for users proximate to the particular PSDS 120. As discussed herein, the identification may be performed by the PSDS 120 through various computer vision processes (i.e., image, face, voice, etc. recognition), as well as from sensor input (i.e., RFID, cell phone signal, etc. identification). In one embodiment, the PSDSs 120 utilize the user identification data to determine if the user has specified any preferences or associations with signage and information server(s) 140. In one embodiment, the user preferences may be received from user computer system 150 or received directly from an interface generated by the PSDS 120. The user preferences may define different servers 140, such as mail servers, financial servers, calendar servers, microblogging servers, content sharing servers, image distribution servers, contextual advertising servers, etc. and associated user authentication data for the services provided by those servers. In one embodiment, when PSDSs 120 detect a user via the identification methods discussed herein, the PSDSs 120 may obtain relevant data from the servers 140 in order to generate a display of the obtained data on a corresponding photo-active pained surface. As a result, a photo-active painted surface is enabled to dynamically display personalized content to particular users.

FIG. 2 is a block diagram of one embodiment 220 of painted surface display system (PSDS). PSDS 220, as illustrated in FIG. 2, provides additional details for the PSDSs 120 discussed above in FIG. 1A.

In one embodiment, PSDS 220 may include one or more sensors 135B (e.g., RFID scanner, cell phone signal scanner, etc.) coupled with a sensor input 240, one or more audiovisual (A/V) capture devices 135A (e.g., a camera, microphone, etc.) coupled with A/V input 230, user recognition and context engine 250, a user ID database 255, a web enabled interface (I/F) 270, a signage engine 260, a signage database 265, content coordinator 160 and a display engine 280 coupled with a spatial electromagnetic EM modulator 125. In one embodiment, the PSDS 220, user computer system 150, signage and information server(s) 140, and content coordinator 160 communicate with each other over various networks and network configurations as discussed above in FIG. 1A. Furthermore, in one embodiment, PSDS 220 may be coupled with user computer system 150 by wired, wireless, or near filed communication connection.

In one embodiment, A/V input 230 receives audiovisual data from A/V capture devices 135A. The audiovisual data may include images, video, sound, etc. In one embodiment, the audiovisual data is provided to user recognition and context engine 250. Furthermore, sensor input 240 receives sensor input data from sensors 135B, such as RFID data, cell phone information, etc. and provides the sensor data to user recognition and context engine 250.

The audiovisual data and sensor data is received by user recognition and context engine 250. In one embodiment, user recognition and context engine 250 performs one or more computer vision processes, such as image recognition, face recognition, voice recognition, etc., on the received audiovisual data to identify users that may be proximate to surface 105 and PSDS 220. Furthermore, user recognition and context engine 250 also utilizes the sensor data to identify users that may be proximate to surface 105 and PSDS 220. In one embodiment, and in response to identification of users that are proximate to surface 105 and/or PSDS 220, user recognition and context engine 250 queries user ID database 255 with results of the audiovisual data analysis and the obtained sensor data. In one embodiment, user ID database 255 stores the identities and identification data for users associated with PSDS 220. In one embodiment, the user identities and/or user identification data are received as user input directly into PSDS 220, or as communicated from user computer system 150.

In one embodiment, user recognition and context engine 250 also determines a real-world context surrounding an identified user. In one embodiment, user recognition and context engine 250 uses the captured audiovisual and sensor data, and performs additional computer vision processes, such as motion recognition to determine whether a user is moving into or out of a physical space, is performing recognizable gestures, whether a nearby PSDS is displaying dynamic signage and identifying that signage's function, etc.

In one embodiment, the context determined by user recognition and context engine 250 is provided to signage engine 260. In one embodiment, signage engine 260 utilizes the context data, such as a determined user's identity, signage being displayed by other PSDSs, etc. to determine whether to display one or more of informative, directional, or personalized dynamic signage to a user. In one embodiment, signage engine 260 queries signage database 265 for signage data associated with a user. In one embodiment, signage database 265 stores data, such as user authentication data, server(s) 140 and services associated with the authentication data, signage data provided by content coordinators 160, etc. In one embodiment, signage database 265 and user ID database 255 may be combined into a single database. Furthermore, signage database 265 and user ID database 255 may be stored remotely at, for example, a content coordinator 160, user computer system 150, or signage and information server 140.

In one embodiment, based on the user ID and context data provided by user recognition and context engine 250, as well as the data determined by signage engine 260, signage engine 260 determines one or more dynamic signs to display to a user. As discussed herein, the signage may include on or more of informative, directional, and personalized signage for display to a user. In one embodiment, the determined signage is provided to display engine 280.

In one embodiment, the signage determined by signage engine 260 is received by display engine 280. As discussed above, display engine 280 drives spatial EM modulator 125 to cause an image, corresponding to the determined signage, to be displayed by photo-active paint 110. In one embodiment, the display of the dynamic signage by the PSDS 220 and the photo-active paint enables a large-scale dynamic and contextual signage display with one or more PSDSs.

In one embodiment, user preferences, user authentication data, and dynamic signage for display by PSDS 220, are received by signage engine 260 via interface 270. In one embodiment, signage engine 260 may receive, and store in database 265, user preferences such as what signage and information server(s) 140 are associated with specific users, their login and password information for accessing signage and information server(s) 140, etc. Furthermore, signage engine 260 may receive signage data, preferences and user identification data as to who to present signage to, and data for generating particular dynamic signages from content coordinators 160 or signage and information servers 140.

Figure 3:
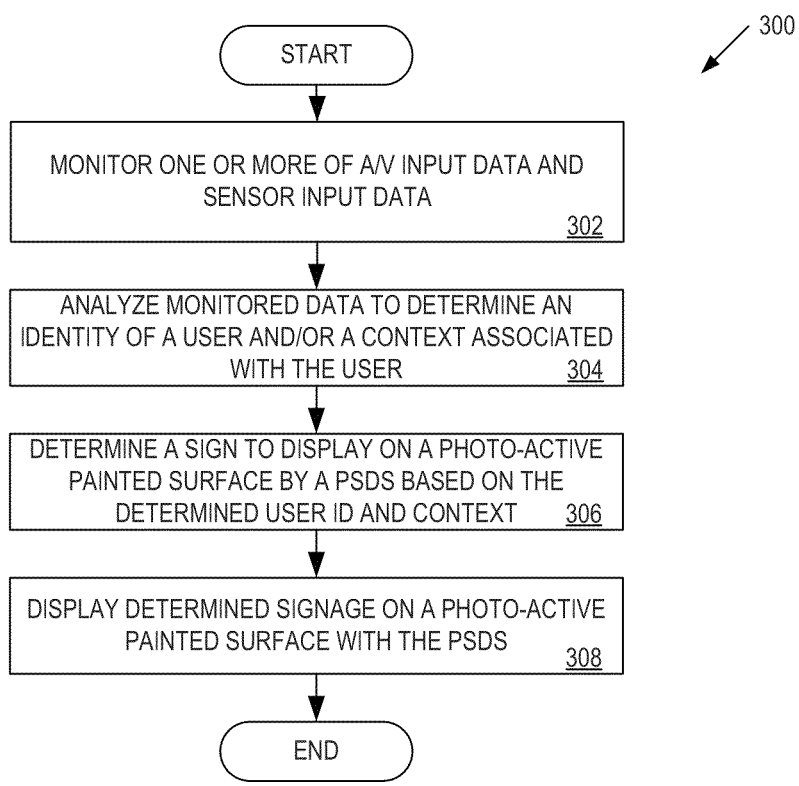
FIG. 3 is a flow diagram of one embodiment of a method for generating dynamic signage in a painted surface display system.

FIG. 3 is a flow diagram of one embodiment of a method 300 for generating dynamic signage in a painted surface display system. The method 300 is performed by processing logic that may comprise hardware (circuitry, dedicated logic, etc.), software (such as is run on a general purpose computer system or a dedicated machine), firmware, or a combination. In one embodiment, the method 300 is performed by one or more of PSDS 120-1 through 120-N, or PSDS 220.

Referring to FIG. 3, processing logic begins by monitoring one or more of A/V input data and sensor data (processing block 302). In one embodiment, the A/V input data is data captured by one or more media capture devices, such as cameras and microphones that capture image, video, and audio data. In one embodiment, the sensor data is captured by one or more devices such as RFID scanners, cell phone information scanners, etc.

Processing logic analyzes the monitored input data to determine an identity and/or context associated with a user captured by the A/V and sensor input data (processing block 304). In one embodiment, processing logic performs one or more computer vision analysis processes on the A/V input data, such as image, face, gesture, motion, voice, etc. recognition processes. Processing logic utilizes the results of the analysis to assist in determining the identity of a user within the captured A/V data. In one embodiment, the sensor data may be used to identify, or augment the computer vision identification, of a user. In one embodiment, RFID or cell phone signal analysis is utilized by processing logic to identify a user. Thus, based on one or more of the A/V data and sensor data analysis, a user's identity can be determined.

In one embodiment, the computer vision analysis processes may also determine a real-world context associated with the identified user. In one embodiment, the real world context may include, for example, whether a user is entering or leaving a specific physical space, whether the user is performing recognizable gestures, whether nearby painted surface display systems are displaying dynamic signage to a user, determining the type and function of a dynamic sign being displayed to a user by a different painted surface display system, etc.

In one embodiment, the real-world context data may also include data such as user preferences. In one embodiment, the user preferences may define remote services that supply data for dynamic signage, user authentication data for accessing those remote services, display preferences for dynamic signage, etc. For example, a dynamic sign may be a user notification bar that displays emails, microblogging feeds, a clock, a calendar, a stock market ticker, etc., the appearance of which is customizable by a user. As another example, a user may also define that dynamic signage display electronic bulletin boards, pictures of the day, live video feeds from remote sources, etc. In one embodiment, the user preferences further refine the real-world context determined from the A/V and sensor input data.

Processing logic determines a sign to display on a photo-active painted surface by a painted surface display system based on the determined user identification and/or context (processing block 306). As discussed herein, the dynamic signage may be informative. In one embodiment, informative signage is signage that is displayed to transfer information from a source, such as a convention organizer, information presenter, etc. to one or more users. The dynamic signage may also be directional. In one embodiment, the directional signage may provide dynamic and real-time direction to a user that span several painted surface display systems in order to guide a user through a physical space, such as a building, to a destination. The dynamic signage may also be personalized. As discussed herein, personalized signage may include information gathered from one or more user-specified remote service providers, such as email servers, microblogging servers, electronic bulletin boards, weather servers, news servers, etc.

Processing logic then displays the determined signage on the photo-active painted surface by the painted surface display system (processing block 308). In one embodiment, processing logic drives a spatial EM modulator to cause an image, corresponding to the determined signage, to be displayed by photo-active paint. In one embodiment, the dynamic signage continues to be displayed for a period of time based on the photo-active paint's chemistry, even when the EM modulator is obstructed. That is, because photo-active paint's reaction to stimulation by the EM modulator causes photo-active paint to display the image, even when an object (i.e., a person, object, animal, etc.) obstructs a line of sight between the spatial EM modulator and the photo-active painted surface, the photo-active paint continues to persist and display the image for a period of time.

Figure 4A:
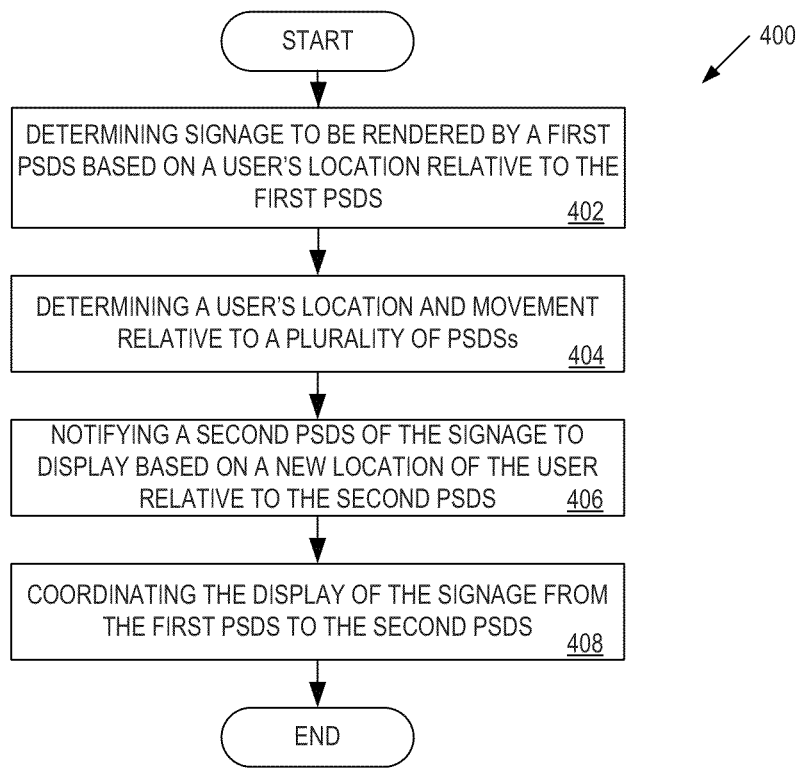
FIG. 4A is a flow diagram of one embodiment of a method for coordinating the display of dynamic signage between different PSDSs.

FIG. 4A is a flow diagram of one embodiment of a method 400 for coordinating the display of dynamic signage between different PSDSs. The method 400 is performed by processing logic that may comprise hardware (circuitry, dedicated logic, etc.), software (such as is run on a general purpose computer system or a dedicated machine), firmware, or a combination. In one embodiment, the method 400 is performed by a content coordinator 160, as discussed above in FIGS. 1A and 2.

Referring to FIG. 4A, processing logic begins by determining signage to be rendered by a first PSDS based on a user's location relative to the PSDS (processing block 402). Processing logic then determines a user's location and movement relative to a plurality of PSDSs (processing block 404). In one embodiment, processing logic monitors a plurality of PSDSs to determine which PSDSs have recognized users with capture A/V and sensor data. Processing logic further monitors the real-world movement of those identified users relative to a plurality of PSDSs. In one embodiment, the monitoring of the identified users and their movement, enables processing logic to track what dynamic signage is being displayed to specific users, what the function of the signage is (i.e., direction, informational, personalized, etc.), and based on the user's movement, which PSDSs should be utilized to display the signage. For example, directional signage displayed to a user who is walking down a hallway may be displayed by a plurality of different PSDSs deployed in the hallway. In one embodiment, the tracking of the user's identity, signage, purpose of the signage, and movement, enables processing logic to coordinate the display and hand-off of the directional signage between PSDSs.

Processing logic notifies a second PSDS of the signage to display based on a new location of the user relative to the second PDS (processing block 406). For example, when a user's real-world movement is indicative of movement beyond the first PSDSs display range, but nearer to a second PSDSs display range, processing logic may notify the second PSDS that their dynamic signage display capabilities will soon be needed. Processing logic coordinates the display of the signage from the first PSDS to the second PSDS (processing block 408). In one embodiment, the tracked user identification, signage display type and purpose, and real world location of the user enable processing logic to direct the second PSDS to continue the display of the dynamic signage, updated as necessary, to the user.

Figure 4B:
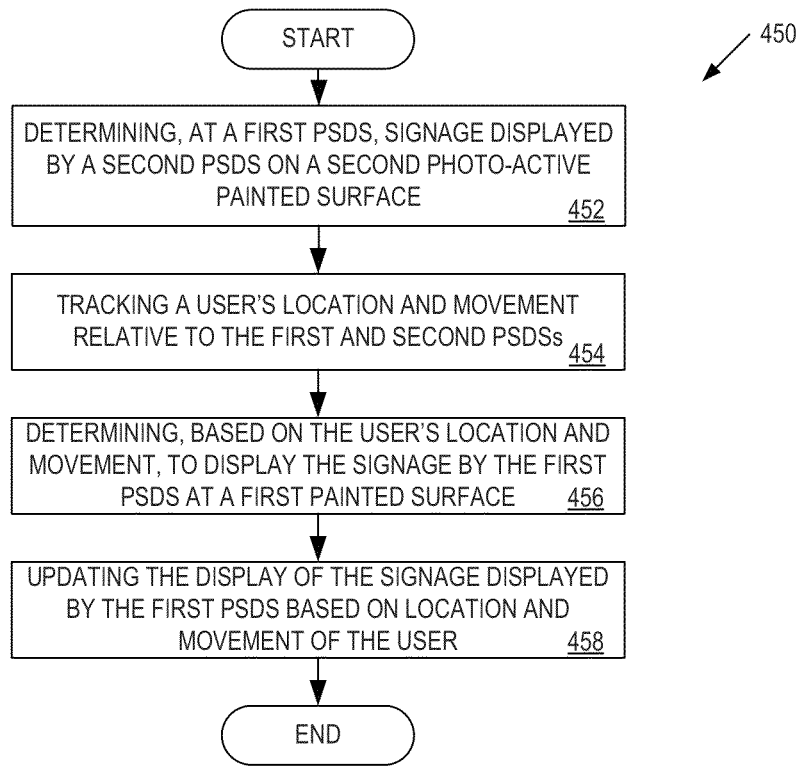
FIG. 4B is a flow diagram of another embodiment of a method for coordinating the display of dynamic signage between different PSDSs.

FIG. 4B is a flow diagram of another embodiment of a method 450 for coordinating the display of dynamic signage between different PSDSs. The method 400 is performed by processing logic that may comprise hardware (circuitry, dedicated logic, etc.), software (such as is run on a general purpose computer system or a dedicated machine), firmware, or a combination. In one embodiment, the method 450 is performed by one or PSDS 120-1 through 120-N, or PSDS 220.

Referring to FIG. 4B, processing logic begins by determining, at a first PSDS, signage displayed by a second PSDS on a second photo-active painted surface (processing block 452). In one embodiment, the first PSDS is monitoring A/V and sensor data for context associated with the signage displayed by the second PSDS. For example, the first PSDS may determine what signage is being displayed by the second PSDS, what the purpose of the signage is (i.e., direction signage), progress of the signage (i.e., movement of the direction signage display relative to a user's location), etc.

Processing logic also tracks a user's location and movement relative to the first and second PSDSs (processing block 454). In one embodiment, processing logic at the first PSDS monitors the user's location and movement to determine whether a user is approaching a display boundary that separates photo-active painted surfaces associated with the first and second PSDSs, as well as the rate at which the user is approaching this boundary.

Processing logic determines, based on the user's location and movement, to render the signage displayed by the second PSDS with the first PSDS at a first painted surface (processing block 456). In one embodiment, the user's location, movement, and signage displayed by the second PSDS are context data that inform processing logic's decision at the first PSDS as to what dynamic signage to display, when, and to whom. Processing logic then updates the display of the signage displayed by the first PSDS based on the location and movement of the user (processing block 458).

In the embodiment discussed above, processing logic in FIG. 4B enables the coordinated display of dynamic signage between different PSDSs without a content coordinator. The embodiments of FIGS. 4A and 4B may be used separately, or may be used in conjunction, to coordinate the display of dynamic signage between PSDSs.

Figure 5:
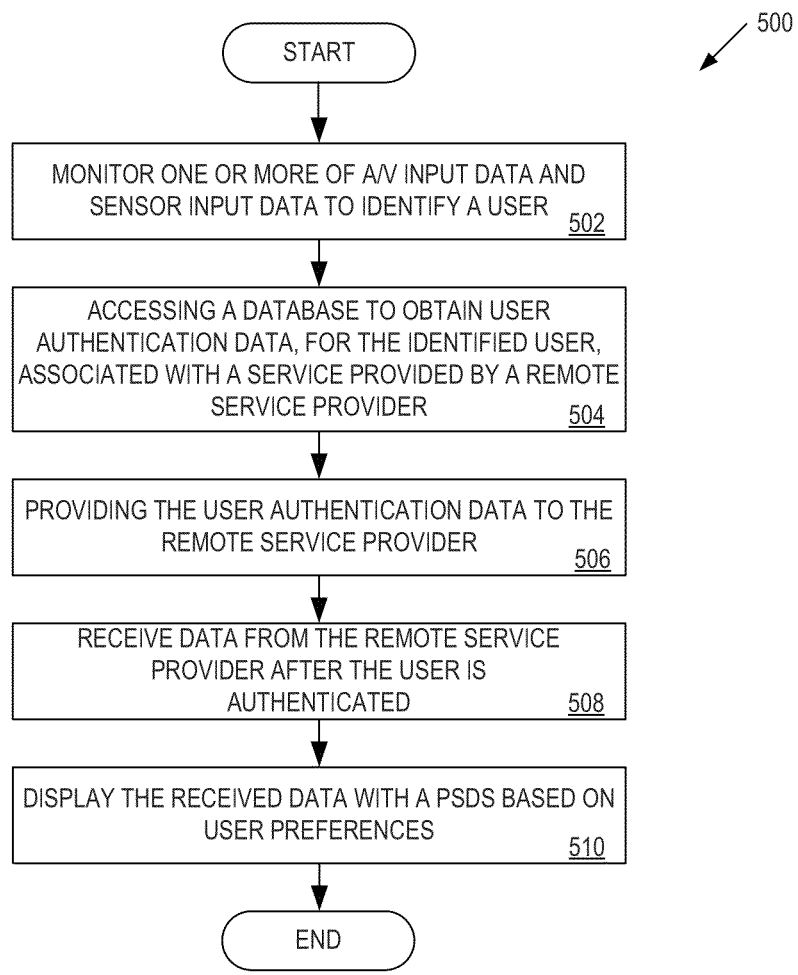
FIG. 5 is a flow diagram of an embodiment of a method for presenting personalized signage by a PSDS.

FIG. 5 is a flow diagram of an embodiment of a method 500 for presenting personalized signage by a PSDS. The method 500 is performed by processing logic that may comprise hardware (circuitry, dedicated logic, etc.), software (such as is run on a general purpose computer system or a dedicated machine), firmware, or a combination. In one embodiment, the method 500 is performed by one or more of PSDS 120-1 through 120-N and PSDS 220.

Referring to FIG. 5, processing logic begins by monitoring one or more of A/V input data and sensor input data to identify a user (processing block 502). As discussed above, processing logic analyzes the monitored input data to determine an identity and/or context associated with a user captured in A/V and sensor input data.

Processing logic accesses a database to obtain user authentication data and user preferences, for the identified user, associated with a service provided by a remote service provider (processing block 504). In one embodiment, processing logic utilizes the user authentication data and preferences to access the service providers. For example, a user's login and password may be used to access a user's email account, microblogging account, an electronic bulletin board, a personal calendar, etc. In one embodiment, these services may be used to obtain data for personalized and dynamic signage.

Processing logic provides the user authentication data to the remote service provider (processing block 506) and receives data from the remote service provider after the user is authenticated (processing block 508).

Processing logic displays the received data with a PSDS based on the user preferences (processing block 510). Continuing the example above, the display of the received data enables the display, on a photo-active painted surface, of a user's email, a microblogging feed, a user's appointment calendar, etc. as a dynamic sign. In one embodiment, processing logic may display the personalized signage as a notification bar. Furthermore, since processing logic bases the display of the personalized data on a user's identity, the personalized signage may change, or be limited, based the identities monitored at processing block 502.

Figure 6:
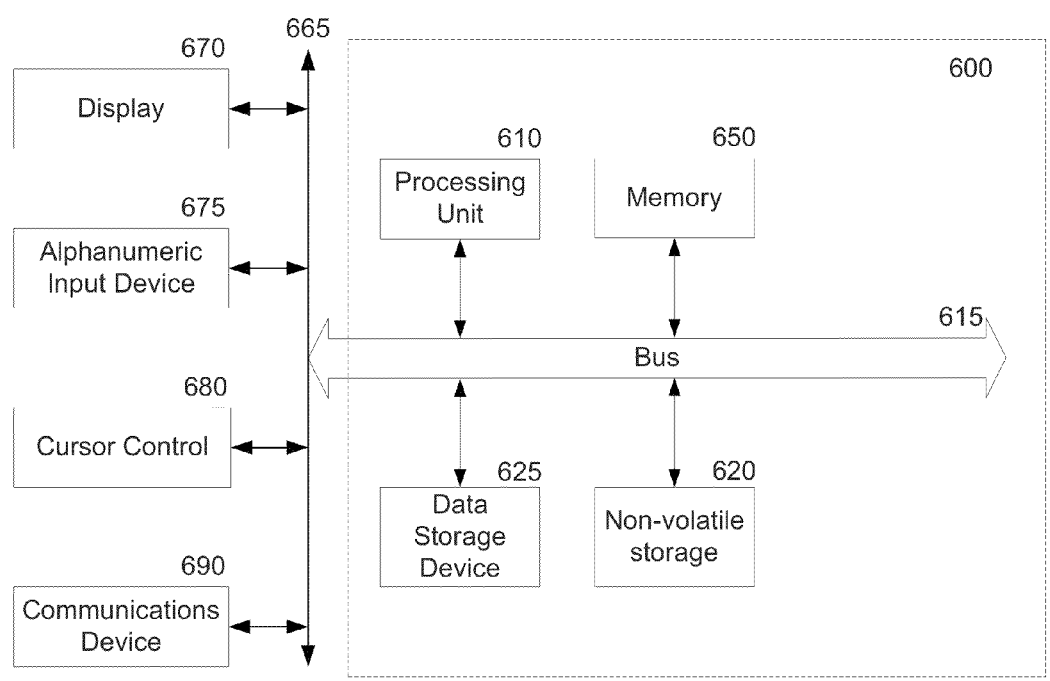
FIG. 6 illustrates a diagrammatic representation of a machine in the exemplary form of a computer system.

FIG. 6 is one embodiment of a computer system that may be used with the present invention. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a cathode ray tube (CRT) or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method, comprising:
capturing image data with at least a camera of a painted surface display system;
analyzing the image data to determine a real-world context proximate to a painted surface, wherein the painted surface is painted with a photo-active paint;
determining electronic signage data based on the determined real-world context;
generating a sign image from the determined electronic signage data based on the determined real-world context; and
driving a spatial electromagnetic modulator to emit electromagnetic stimulation in the form of the sign image to cause the photo active paint to display the sign image on the painted surface,
wherein capturing the image data includes capturing image data of both the sign image displayed on the painted surface and a user located adjacent to the painted surface,
wherein analyzing the image data to determine the real-world context includes analyzing the user relative to the sign image currently displayed on the painted surface.

2. The method of claim 1, wherein the sign image displayed on the photo-active paint persists for a period of time even when the user moves into a path between the spatial electromagnetic modulator and the sign image displayed on photo-active paint.

3. The method of claim 1, wherein analyzing the image data to determine a real-world context further comprises:
performing one or more computer vision processes on the image data to identify the user within the image data; and
selecting the signage, based at least in part, on an identity of the user.

4. The method of claim 3, further comprises:
determining one or more signage preferences associated with the user; and
selecting the signage based on the one or more signage preferences.

5. The method of claim 3, further comprising:
based on the identity of the person, obtaining user authentication data associated with the user;
providing the authentication data to one or more remote service providers; and
obtaining data from the one or more remote service providers for display in the selected signage.

6. The method of claim 5, wherein the data from the one or more remote service providers includes one or more of electronic mail, a microblog, an electronic bulletin board, weather data, news data, calendar data, an image, a video, or an advertisement.

7. The method of claim 1, where selecting signage data based on the determined real-world context further comprises:
receiving tracking data indicative of signage data being displayed to the user by a second painted surface display system, wherein the tracking data includes at least data indicative of one or more sign images being displayed to the user by the second painted surface display system and data indicative of a movement of the user relative to the painted surface display system and the second painted surface display system;

receiving instructions at the painted surface display system to display the one or more sign images being displayed to the user by the second painted surface display system; and selecting the one or more sign images for display by the painted surface display system based on the received instructions.

8. The method of claim 1, where analyzing the image data and selecting signage data further comprises:

analyzing the image data to determine signage data displayed by a second painted surface display system, the determined signage data to refine the real-world context proximate to a painted surface;

tracking the user's location within the image data to determine a corresponding real-world location and movement of the user relative to the painted surface display system and the second painted surface display system; and based on the real-world location and movement of the user, selecting at the painted surface display system to display the signage data displayed by the second painted surface display system with the painted surface display system.

9. The method of claim 1, wherein the selected signage data is an electronic sign to be displayed on the painted surface of a convention center.

10. The method of claim 1, wherein the selected signage data includes direction data to display real-world directions on the painted surface to direct the user to a real-world destination.

11. The method of claim 1, further comprising:

capturing sensor data with one or more sensors of the painted surface display system;

analyzing the sensor data to determine an identity of the user proximate to one or more of the painted surface or the painted surface display system; and selecting signage data based at least in part on the determined identity of the user.

12. The method of claim 11, wherein the sensor data includes one or more of radio-frequency identification data or cell phone signal data associated with the user.

13. The method of claim 1, wherein the photo-active paint is one of a photo-luminescent material that emits visible spectrum light in response to electromagnetic stimulation or a photochromatic material that changes light absorption properties in response to the electromagnetic stimulation.

14. A non-transitory computer readable storage medium including instructions that, when executed by a processor, cause the processor to perform a method comprising:

capturing image data with at least a camera of a painted surface display system;

analyzing the image data to determine a real-world context proximate to a painted surface, wherein the painted surface is painted with a photo-active paint;

determining electronic signage data based on the determined real-world context;

generating a sign image from the determined electronic signage data based on the determined real-world context; and driving a spatial electromagnetic modulator to emit electromagnetic stimulation in the form of the sign image to cause the photo active paint to display the sign image on the painted surface, wherein capturing the image data includes capturing image data of both the sign image displayed on the painted surface and a user located adjacent to the painted surface, wherein analyzing the image data to determine the real-world context includes analyzing the user relative to the sign image currently displayed on the painted surface.

15. The non-transitory computer readable storage medium of claim 14, wherein the sign image displayed on the photo-active paint persists for a period of time even when an obstruction moves into a path between the spatial electromagnetic modulator and the sign image displayed on photo-active paint.

16. The non-transitory computer readable storage medium of claim 14, wherein analyzing the image data to determine a real-world context further comprises:

performing one or more computer vision processes on the image data to identify the user within the image data; and selecting the signage, based at least in part, on the identity of the user.

17. The non-transitory computer readable storage medium of claim 14, where selecting signage data based on the determined real-world context further comprises:

receiving tracking data indicative of signage data being displayed to the user by a second painted surface display system, wherein the tracking data includes at least data indicative of one or more sign images being displayed to the user by the second painted surface display system and data indicative of a movement of the user relative to the painted surface display system and the second painted surface display system;

receiving instructions at the painted surface display system to display the one or more sign images being displayed to the user by the second painted surface display system; and selecting the one or more sign images for display by the painted surface display system based on the received instructions.

18. The non-transitory computer readable storage medium of claim 14, where analyzing the image data and selecting signage data further comprises:

analyzing the image data to determine signage data displayed by a second painted surface display system, the determined signage data to refine the real-world context proximate to a painted surface;

tracking the user's location within the image data to determine a corresponding real-world location and movement of the user relative to the painted surface display system and the second painted surface display system; and based on the real-world location and movement of the user, selecting at the painted surface display system to display the signage data displayed by the second painted surface display system with the painted surface display system.

19. The non-transitory computer readable storage medium of claim 14, wherein the selected signage data is an electronic sign to be displayed on the painted surface of a convention center.

20. The non-transitory computer readable storage medium of claim 14, wherein the selected signage data includes direction data to display real-world directions on the painted surface to direct the user to a real-world destination.

21. The non-transitory computer readable storage medium of claim 14, further comprising:

capturing sensor data with one or more sensors of the painted surface display system;

analyzing the sensor data to determine an identity of the user proximate to one or more of the painted surface and the painted surface display system;

selecting signage data based at least in part on the determined identity of the user.

22. A painted surface display system comprising:

an audiovisual capture device to capture image data with at least a camera of a painted surface display system and a user located adjacent to a painted surface;

a user recognition and context engine to analyze the image data to determine a real-world context proximate to the painted surface, wherein the painted surface is painted with a photo-active paint;

a signage engine to determine electronic signage based on the determined real-world context; and a display engine to generate a sign image for the determined electronic signage based on the determined real-world context, and drive a spatial electromagnetic modulator to emit electromagnetic stimulation in the form of the sign image to cause the photo active paint to display the sign image on the painted surface, wherein the user recognition and context engine is configured to analyze the user relative to the sign image currently displayed on the painted surface when determining the real-world context.

\* \* \* \* \*